(12) United States Patent
Carre

(10) Patent No.: US 6,811,803 B2
(45) Date of Patent: Nov. 2, 2004

(54) AVOCADO CONCENTRATE AND PROCESS FOR PREPARING SAME

(76) Inventor: Eric Carre, 1486 Prairie Trail, Grayslake, IL (US) 60030

( * ) Notice: Subject to any disclaimer, the term of this patent is extended or adjusted under 35 U.S.C. 154(b) by 268 days.

(21) Appl. No.: 10/084,036

(22) Filed: Feb. 27, 2002

(65) Prior Publication Data
US 2003/0165598 A1 Sep. 4, 2003

(51) Int. Cl.[7] .................. A23L 3/34; A23L 1/212
(52) U.S. Cl. .................. 426/541; 526/615; 526/654
(58) Field of Search .................. 426/615, 654, 426/541

(56) References Cited

U.S. PATENT DOCUMENTS

2002/0054950 A1 * 5/2002 Selleck .................. 426/615

* cited by examiner

*Primary Examiner*—Helen Pratt
(74) *Attorney, Agent, or Firm*—Welsh & Katz, Ltd.

(57) ABSTRACT

A composition for stabilizing avocado meat is disclosed that comprises acids from cultured dextrose, erythorbic acid, ascorbic acid, quercetin and inulin that are present in weight ratios of about 1:2–2.5:2.25–2.75:0.9–1.1:6–7, respectively. That composition is admixed in a color-stabilizing amount with avocado meat to form a color-stabilized avocado concentrate. A method for the preparation of a color-stabilized avocado concentrate is also disclosed.

14 Claims, 1 Drawing Sheet

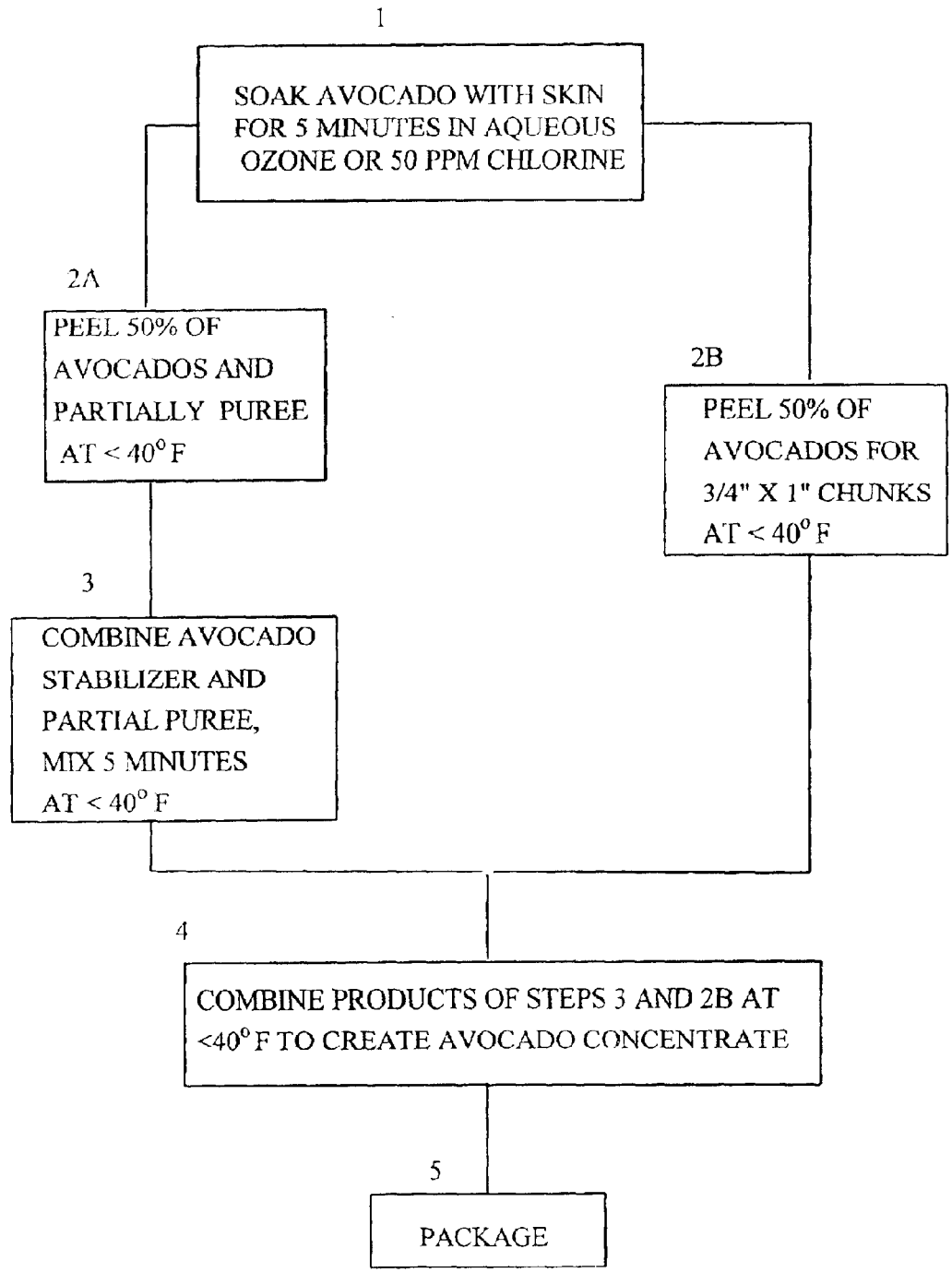

AVOCADO CONCENTRATE AND PROCESS FOR PREPARING SAME

FIELD OF THE INVENTION

This invention pertains to the preparation of food stuffs. More particularly, the present invention relates to a composition for stabilizing avocado meat, a stabilized avocado concentrate suitable for eating itself or for the preparation of a food such as guacamole, and a process for preparing a stabilized avocado concentrate.

BACKGROUND OF THE INVENTION

Browning, or oxidative darkening, of food products can result from both enzymatic and non-enzymatic chemical reactions in food. Both enzymatic and non-enzymatic browning constitute serious problems for the food industry and result in millions of pounds of wasted food products each year.

Several physical methods have been developed for inhibiting oxidation and the resultant browning. One of the most common and well-known methods is heat inactivation of the enzymes through pasteurization or similar processes. Additional physical methods involve vacuum, dehydration, and the like, all of which have drawbacks either in the loss of flavor from the food or ineffectiveness in the result.

U.S. Pat. No. 5,871,794 teaches that the flesh of the tomatillo can be admixed with avocado flesh to inhibit spoilage and/or oxidation of the avocado. The inhibitory effect is said to be a result of a natural antioxidant or preservative present in the tomatillo.

In addition to the various physical processes that can be used to inhibit oxidation, the addition of chemical agents is also well known. Sulfiting agents such as sulfur dioxide and sodium bisulfite are one of the most well known oxidation inhibitors. In addition to sulfiting agents, other chemical preservation agents have been used to inhibit oxidation in various food products. Representative examples of such chemical preservation agents include discoloration inhibitors such as ascorbic acid, citric acid, ascorbic acid and malic acid, in addition to other additives such as salt, ethylenediaminetetraacedic acid (EDTA), dextrose, calcium chloride, sodium acid pyrophosphate and sodium citrate. However, none of these discoloration inhibitors has been found to be as effective as sulfites, which have their own problems.

Other techniques using various combinations of acids and antioxidants were utilized without success in conjunction with this work. Thus, mixtures of citric acid and erythorbic acid, citric acid and sodium citrate, citric acid and ascorbic acid, and citric acid and sodium metabisulfite failed to provide the desired preservation while maintaining a desired taste and feel in the mouth.

The invention described hereinafter provides one means by which an avocado-containing concentrate and a product made therefrom such as guacamole can be stabilized to discoloration without the drawbacks provided from the use of sulfites or other ingredients

BRIEF SUMMARY OF THE INVENTION

The present invention contemplates a composition for stabilizing avocado meat (pulp) that comprises erythorbic acid, ascorbic acid, quercetin and inulin that are present in weight ratios of about 1:2–2.5:2.25–2.75:1:5.5–6.5, respectively.

Also contemplated herein is an avocado concentrate prepared from avocado and a color-stabilizing amount of the above stabilizing composition from which desired food products such as a guacamole can be prepared, and methods of preparing the concentrate and food product.

The present invention has several benefits and advantages. One benefit of the present invention is the provision of a composition that can stabilize avocado pulp (meat).

An advantage of the present invention is a stabilized avocado pulp concentrate that can be stored under refrigeration at about 37–40° F. for 60 days or longer.

Another benefit of the present invention is a process for preparing a stabilized avocado concentrate composition that does not require extensive physical processing steps such as complex vacuum processing, dehydration, emulsification or high pressure treatment.

Another advantage of the invention is the provision of a product prepared from a contemplated avocado concentrate such as guacamole.

A further benefit of the invention is a process for preparing a stabilized avocado concentrate composition by mixing avocado pulp with the stabilizing composition.

Still further benefits and advantages will be apparent to the skilled worker from the discussion that follows.

BRIEF DESCRIPTION OF THE DRAWING

The FIGURE is a diagram showing the method steps of the invention.

DESCRIPTION OF THE PREFERRED EMBODIMENTS

A contemplated composition for stabilizing avocado meat (pulp) comprises acids from cultured dextrose, erythorbic acid, ascorbic acid, quercetin and inulin that are present in weight ratios of about 1:2–2.5:2.25–2.75:0.9–1.1:6–7, respectively. More preferably, those ingredients are present at ratios to each other of about 1:2.2–2.4:2.5–2.7:0.9–1.0:6.2–6.4, respectively.

Of the above ingredients, erythorbic acid is a strong reducing agent, which alone or in concert with citric acid was incapable of stabilizing avocado meat from discoloration. Erythorbic acid has a structure that corresponds to the formula:

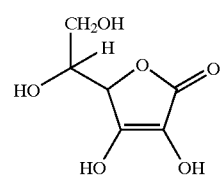

Quercetin is the aglycone of quercitrin, of rutin and other glycosides. It has the structure of:

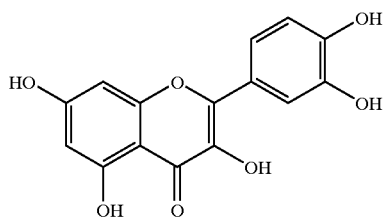

In a broad sense the subject invention comprises a stabilizing amount of quercitin with avocado meat, and more particularly, a stabilizing amount of an acidified mixture of quercetin and avocado. Such a formulation achieves the desired stabilization, while maintaining the desired taste and texture of the avocado product. Thus, the acids from cultured dextrose also referred to herein as "dry vinegar" provide acidity for inhibiting microbial growth, while itself providing a bland flavor as compared to a more usually used acidulent such as vinegar itself. Quercetin may be used in an amount of between 15 to 10% of the stabilizing concentrate, and preferably about 7%.

Erythorbic acid provides some acidity and is a known antioxidant. However, as noted previously, erythorbic acid was unsuccessfully used in conjunction with other ingredients such as citric acid to preserve avocado pulp but works here. Erythorbic acid may be used in an amount of between 15 to 20% of the stabilizing concentrate, and preferably about 17%.

The vitamin C (ascorbic acid) provides acidity and also appears to work with the quercetin to prolong the antioxidant lifetime of quercetin. A preferred ascorbic acid is obtained from a non-citrus source such as taro root. Quercetin is itself a strong antioxidant that is normally used as a nutritional aid (nutraceutical) and is not believed to have been previously used as a food additive antioxidant. Ascorbic acid may be used in an amount of between 15 to 25% of the stabilizing concentrate and preferably about 20%.

Inulin is a polysaccharide having an average of about 20 to about 40 polymerized saccharide monomers per molecule. Inulin is available from a number of commercial suppliers. One preferred product, available from Imperial Sensus of Sugar Land Tex., is said to have an average chain length of about 24 saccharide monomer units.

Inulin can provide healthful fiber to one's diet, while also assisting the concentrate or finished product by binding the water present in the product (inhibit weeping). Free water in a food product that results from weeping can provide a particularly suitable environment for microbial growth. Inulin may be used in an amount equal to 30 to 60% of the stabilizing compound and preferably about 48%.

The previously noted so-called "dry vinegar" comprises organic acids derived from the lactobaccillus fermentation of dextrose. Such a product is available from PTX Food Corp. of Elmsford, N.Y. This dry vinegar is a powder with a bland taste and, when diluted eight times provides a solution with a pH value of 2.35±0.2.

The so-called dry vinegar is produced by a series of aerobic and anaerobic fermentations using food-acceptable lactobacillus organisms that have not been genetically modified. The product is dried with wheat starch and or malto dextrins and silica. Dry vinegar may be used in an amount between 5 to 10% of the stabilizing compound and preferably about 7.5%.

Also contemplated herein is a stabilized avocado concentrate that can be eaten as is or can be used as an intermediate from which desired food products such as a guacamole can be prepared by admixture with additional desired ingredients. A method of preparing the concentrate is also contemplated.

A stabilized avocado concentrate composition in one form of the present invention comprises avocado meat, along with a color-stabilizing amount of an above-described stabilizing composition. The concentrate preferably has a pH value of about 4 to about 5, and more preferably of about 4.5 to about 5.

The avocado meat is present in a weight ratio of about 25–50:1 relative to the before-defined stabilizing composition. More preferably, that weight ratio is about 30–40:1. One or more additional ingredients such as salt, pepper, sugar, garlic, onion, and lime or lemon juice can also be present in the avocado concentrate, as can additional antimicrobial agents to provide stability for the added ingredients. On a percentage basis, the avocado can comprise about 85 to about 98 weight percent of the concentrate, while maintaining the before-mentioned ratio to the stabilizing ingredients.

Particularly preferred additional antimicrobial materials are those materials sold by Rhodia Food Ingredients of Madison Wis. under the trademarks MICROGUARD® 300 and MICROGUARD® 285. MICROGUARD® 285 is said by its manufacturer to contain maltodextrin, cultured dextrose and potassium sorbate, whereas MICROGUARD® 300 is said to contain skim milk and cultured skim milk. MICROGUARD® 285 is said to use a propionic strain of bacteria in its fermentation, whereas MICROGUARD® 300 is said to use a lactococcus lactis strain of bacteria in its fermentation.

In addition, minor amounts of an acidulent to provide a desired pH value to the concentrate can also be used. As before-described, erythorbic acid can be used as can other acids such as ascorbic acid, vinegar, malic acid and the like.

Reference is made to FIG. 1 for the procedure used in a process of the subject invention. In step 1, the avocado (with skin) is soaked for about 5 minutes in disinfecting solution such as in an aqueous medium containing ozone or in a 50 ppm solution of chlorine in water. About one-half of the cleaned avocados are then peeled and pureed at a temperature of less than about 40° F. (less than about 4–5° C.; step 2A). This puree is mixed with the avocado stabilizing composition (step 3) to form a first admixture. The remaining cleaned avocados (about an amount equal to the first-recited amount; i.e., about one-half the original amount) are peeled and cut into chunks of a size of about ¾" to about 1" (about 2 to about 2.5 cm) at a temperature less than 40° F. (step 2B). The puree from step 3 is admixed (combined) in step 4 with the avocado chunks from step 2B at temperature of less than 40° F. to form the concentrate.

Additional ingredients such as flavorants like minced onion, garlic granulated salt, granulated sugar and lime juice can also be admixed at this step, as can any additional antimicrobial agents. These latter ingredients can also be admixed at or before step 3 or at any other convenient time. The completed concentrate may then be packaged in step 5.

The concentrate so prepared can be used directly for the preparation of another food product such as guacamole, but is usually vacuum packed in is containers designed to be stored under refrigeration. The concentrate can also be frozen, but one of the salient points concerning a contemplated concentrate is that that composition need not be frozen and can remain in a refrigerator for at least 60 days without discoloration or apparent spoilage.

In the process of the present invention, the avocado meat is prepared by separating it from the seed and skin and then dicing it into small pieces. This can be accomplished by cutting the avocado in half, removing the pit and separating the flesh from the skin. Preferably the avocado flesh is diced into small cubes to facilitate mixing. Any known means to facilitate the recovery of avocado flesh and its reduction to smaller sized pieces for mixing is appropriate.

The concentrate is, of course, edible and can be sold for ultimate consumption as it is prepared. However, a contemplated final food product such as a guacamole can contain about 85 to about 95 weight percent of the above-described avocado concentrate along with other flavoring ingredients such as peppers, onions, cilantro, garlic tomato and the like. Further, the types of flavoring agents that can be used are not limited to those discussed here. Other spices, herbs and seasonings may be used depending on individual taste.

EXAMPLE 1

Avocado Stabilizing Composition

A series of avocado stabilizing compositions is prepared by physically admixing the ingredients in Table 1 below in which amounts are shown as weight percentages.

TABLE 1

| Ingredient | Weight Percentage | | | | |
| --- | --- | --- | --- | --- | --- |
| Dry Vinegar* | 8.01 | 7.78 | 7.67 | 7.54 | 7.43 |
| Erythorbic Acid | 16.35 | 16.38 | 17.24 | 17.34 | 16.54 |
| Ascorbic Acid | 18.67 | 19.03 | 19.46 | 19.99 | 20.02 |
| Quercetin | 7.52 | 7.46 | 7.38 | 7.14 | 7.31 |
| Inulin | 49.45 | 49.35 | 48.25 | 47.99 | 48.70 |

*PTX Food Corp. of Elmsford, New York.

EXAMPLE 2

Preparation of Avocado Concentrate

A series of avocado concentrates is prepared following the steps outlined in FIG. 1 and the previous discussion. The compositions of exemplary concentrates are provided in Table 2, below. The avocado meat may be added as puree or as chunks, or as a combination of puree and chunks.

TABLE 2

| | Guacamole | | | |
| --- | --- | --- | --- | --- |
| Ingredient | Weight Percentage | | | |
| Avocado Meat Fresh Hass | 88.79 | 94.86 | 90.79 | 90.00 |
| Salt, Granulated | 1.35 | 0.36 | 1.37 | 1.37 |
| Sugar, White Granulated | 0.19 | 0.48 | 0.19 | 0.19 |
| Stabilizing Composition | 3.08 | 3.00 | 2.19 | 1.76 |
| Lime Juice | 4.22 | — | 4.28 | 4.28 |
| Garlic, Granulated | 0.47 | — | 0.48 | 0.47 |
| Onion, Minced | 0.7 | — | 0.71 | 0.71 |
| Microguard ® 285 | 0.48 | 0.52 | — | 0.49 |
| Microguard ® 300 | 0.72 | 0.78 | — | 0.73 |

A avocado concentrate prepared as above is stable to discoloration and passes a standard assay for microbial contamination after 60 days of refrigeration. Microbial assays are carried out by Silliker Laboratories of Illinois, Chicago Heights, Ill. using assay AOAC 966.23.

Further embodiments can be chosen by using different combinations of flavoring agents according to varying tastes. However, the general principles for obtaining a guacamole composition that is stabilized against oxidation without the use of usual antioxidant additives are applicable as discussed above even though the combination of ingredients can be different or more complex. Thus, although several embodiments have been discussed and other embodiments have been generally described, it is understood that the invention is not limited thereto, because many modifications can be made and will become apparent to those skilled in the art. The use of the article "a" or "an" is intended to include one or more.

What is claimed is:

1. A composition for stabilizing avocado meat that comprises acids from cultured dextrose, erythorbic acid, ascorbic acid, quercetin and inulin that are present in weight ratios of about 1 part dextrose to 2.0–2.5 parts erythorhic acid to 2.25–2.75 parts ascorbic acid to 0.9–1.1 part quercetin to 6–7 parts inulin respectively.

2. The stabilizing composition according to claim 1 wherein said ingredients are present at ratios to each other of about 1 part dextrose to 2.2–2.4 parts erythorhic acid to 2.5–2.7 parts ascorbic acid to 0.9–1.0 part quercetin to 6.2–6.4 parts inulin, respectively.

3. A stabilized avocado concentrate composition comprising avocado meat admixed with a color-stabilizing amount of a stabilizing composition that itself comprises acids from cultured dextrose, erythorbic acid, ascorbic acid, quercetin and inulin that are present in weight ratios of about 1 part dextrose to 2.0–2.5 parts erythorhic acid to 2.25–2.75 parts ascorbic acid to 0.9–1.1 part quercetin to 6–7 parts inulin, respectively.

4. The stabilized avocado concentrate according to claim 3 having a pH value of about 4 to about 5.

5. The stabilized avocado concentrate according to claim 3 wherein said avocado meat is present in a weight ratio of about 25–50:1 relative to said stabilizing composition.

6. A stabilized avocado concentrate composition comprising avocado meat admixed with a color-stabilizing amount of a stabilizing composition that itself comprises acids from cultured dextrose, erythorbic acid, ascorbic acid, quercetin and inulin that are present at weight ratios of about 1 part dextrose to 2.0–2.5 parts erythorhic acid to 2.25–2.75 parts ascorbic acid to 0.9–1.1 part quercetin to 6–7 parts inulin, respectively, wherein said avocado meat is present at a weight ratio of about 25–50:1 relative to said stabilizing composition, and said concentrate had a pH value of about 4 to about 5.

7. The stabilized avocado concentrate according to claim 6 having a pH value of about 4.5 to about 5.

8. The stabilized avocado concentrate according to claim 6 wherein said avocado meat is present in a weight ratio of about 30–40:1 relative to said stabilizing composition.

9. The stabilized avocado concentrate according to claim 6 including one or more additional ingredients selected for the group consisting of salt, pepper, sugar, onion, garlic and lime or lemon juice.

10. A method of preparing an avocado concentrate comprising the steps of:
   a) admixing an avocado puree with a composition for stabilizing avocado meat at a temperature of less than about 40° F., said stabilizing composition comprising acids from cultured dextrose, erythorbic acid, ascorbic acid, quercetin and inulin that are present in weight ratios of about 1 part dextrose to 2.0–2.5 parts erythorbic acid to 2.25–2.75 parts ascorbic acid to 0.9–1.1 part quercetin to 6–7 parts inulin, respectively, to form a first admixture; and b) admixing said first admixture with about an equal weight of avocado chunks sized at about 2 to about 2.5 cm at a temperature of less than about 40° F. to form said concentrate.

11. The method according to claim 10 including the further step of packaging said concentrate.

12. The method according to claim 10 including the further step of admixing one or more additional ingredients selected from the group consisting of salt, pepper, sugar, onion, garlic and lime or lemon juice.

13. The method according to claim 11 wherein one or more additional ingredients is admixed along with the ingredients of said first admixture.

14. A composition of stabilized avocado meat including an acidified solution of about 15%–25% quercetin, about 5–10% of cultured dextrose, about 15–20% of Erythorbic acid; and about 30–60% Inulin.

* * * * *